United States Patent
De Boer et al.

(10) Patent No.: US 11,247,423 B2
(45) Date of Patent: Feb. 15, 2022

(54) METHOD AND ASSEMBLY FOR APPLYING A TIRE COMPONENT TO A DRUM

(71) Applicant: VMI HOLLAND B.V., Epe (NL)

(72) Inventors: Hans De Boer, Epe (NL); Henk-Jan Grolleman, Epe (NL)

(73) Assignee: VMI HOLLAND B.V.

( * ) Notice: Subject to any disclaimer, the term of this patent is extended or adjusted under 35 U.S.C. 154(b) by 0 days.

(21) Appl. No.: 16/616,200

(22) PCT Filed: May 17, 2018

(86) PCT No.: PCT/NL2018/050326
§ 371 (c)(1),
(2) Date: Nov. 22, 2019

(87) PCT Pub. No.: WO2018/217080
PCT Pub. Date: Nov. 29, 2018

(65) Prior Publication Data
US 2020/0156338 A1    May 21, 2020

(30) Foreign Application Priority Data
May 22, 2017   (NL) .................................... 2018959

(51) Int. Cl.
*B29D 30/44*        (2006.01)
(52) U.S. Cl.
CPC ...... *B29D 30/44* (2013.01); *B29D 2030/4418* (2013.01); *B29D 2030/4456* (2013.01)
(58) Field of Classification Search
CPC .... B29D 2030/4456; B29D 2030/4406; B29D 2030/4425; B29D 2030/427;
(Continued)

(56) References Cited

U.S. PATENT DOCUMENTS

| | | | | |
|---|---|---|---|---|
| 5,292,398 A | * | 3/1994 | Miyamoto | B29D 30/58 156/130 |
| 5,582,664 A | * | 12/1996 | Sergel | B29D 30/3007 156/130 |

(Continued)

FOREIGN PATENT DOCUMENTS

| | | | | |
|---|---|---|---|---|
| CN | 101088746 | 12/2007 | ............. | B29D 30/44 |
| CN | 103930261 | 7/2014 | ............. | B29C 65/78 |

(Continued)

OTHER PUBLICATIONS

/Decision to Grant issued in corresponding Korean Patent Application Serial No. 10-2019-7034229, dated Mar. 12, 2020, with translation (6 pages).

(Continued)

*Primary Examiner* — Robert C Dye
*Assistant Examiner* — Alexander D Booth
(74) *Attorney, Agent, or Firm* — Hayes Soloway P.C.

(57) ABSTRACT

Disclosed is a method and an assembly for applying a tire component onto a receiving member. The method includes the steps of: receiving the tire component on the apply member; detecting a plurality of leading endpoints at the leading edge and detecting a plurality of trailing endpoints at the trailing edge in-line with the leading endpoints in the longitudinal direction; determining the distance in the longitudinal direction between the leading endpoint and the trailing endpoint for each pair of endpoints; driving the apply member at an apply speed in a transfer direction to transfer the tire component onto the receiving member while driving the receiving member at a receiving speed; and adjusting the ratio between the apply speed and the receiving speed during the transfer of the tire component in the order in which the pairs of endpoints are spliced to improve the relative positioning of each pair of endpoints for splicing.

33 Claims, 16 Drawing Sheets

(58) Field of Classification Search
CPC ........ B29D 30/2607; B29D 2030/4418; B29D 2030/44; B29D 2030/425; B29D 2030/4437; B29D 2030/4443; B29D 30/1607; B29D 2030/0038; B29D 30/30

See application file for complete search history.

(56) References Cited

U.S. PATENT DOCUMENTS

| | | | | |
|---|---|---|---|---|
| 5,720,837 | A * | 2/1998 | Regterschot | B29D 30/3007 156/123 |
| 5,882,457 | A * | 3/1999 | Currie | B29D 30/3007 156/130 |
| 6,092,295 | A | 7/2000 | Parrish | G01B 5/20 |
| 6,994,140 | B2 | 2/2006 | Koelker et al. | 156/351 |
| 8,667,871 | B2 | 3/2014 | Van Laar et al. | 83/76.8 |
| 9,849,644 | B2 | 12/2017 | Nijland | B29D 30/42 |
| 10,457,004 | B2 | 10/2019 | Janszen et al. | B29D 30/0016 |
| 2001/0002608 | A1 | 6/2001 | Okada et al. | B29D 30/08 |
| 2003/0066610 | A1 | 4/2003 | Kolker et al. | 156/394.1 |
| 2007/0289694 | A1 | 12/2007 | Macheffe et al. | 156/133 |
| 2008/0314524 | A1 | 12/2008 | Delgado et al. | 156/397 |
| 2011/0036485 | A1 * | 2/2011 | Rey | B29D 30/30 156/117 |
| 2013/0199697 | A1 | 8/2013 | Ravat et al. | 156/64 |
| 2014/0054129 | A1 | 2/2014 | Wedekind | 198/339.1 |
| 2014/0305575 | A1 | 10/2014 | Ito | B29C 66/855 |
| 2016/0009042 | A1 | 1/2016 | Lemma et al. | B29D 30/30 |
| 2016/0263847 | A1 * | 9/2016 | Janszen | B65H 23/0326 |

FOREIGN PATENT DOCUMENTS

| | | | |
|---|---|---|---|
| CN | 104349995 | 2/2015 | ............ B65D 90/10 |
| CN | 106273593 | 1/2017 | |
| CN | 106515059 | 3/2017 | ............ B29D 30/42 |
| CN | 106604812 | 4/2017 | ............ B29C 65/00 |
| EP | 0515227 | 11/1992 | ............ B29D 30/30 |
| JP | H4-347630 | 12/1992 | ............ B29D 30/26 |
| JP | H10-156966 | 6/1998 | ............ B29D 30/30 |
| JP | 2007-529344 | 10/2007 | ............ B29D 30/46 |
| JP | 2010260178 | 11/2010 | ............ B29D 30/44 |
| JP | 2013-526437 | 6/2013 | ............ B29D 30/30 |
| JP | 2017-501059 | 1/2017 | ............ B29D 30/30 |
| KR | 20150084812 | 7/2015 | ............ B29D 30/00 |
| WO | WO215069102 | 5/2015 | ............ B29D 30/44 |

OTHER PUBLICATIONS

Official Action issued in corresponding Chinese Patent Application Serial No. 201880033830.0, dated Apr. 13, 2020, with translation (10 pages).

Decision to Grant issued in corresponding Japanese Patent Application Serial No. 2018-553190, dated Oct. 9, 2019, with translation (5 pages).

International Search Report issued in corresponding PCT International Patent Application Serial No. PCT/NL2018/050326, dated Aug. 21, 2018 (4 pgs).

Written Opinion issued in corresponding PCT International Patent Application Serial No. PCT/NL2018/050326, dated Nov. 29, 2018 (6 pgs).

Official Action issued in corresponding Chinese Patent Application Serial No. 201880033830.0, dated Dec. 1, 2020 (6 pages).

* cited by examiner

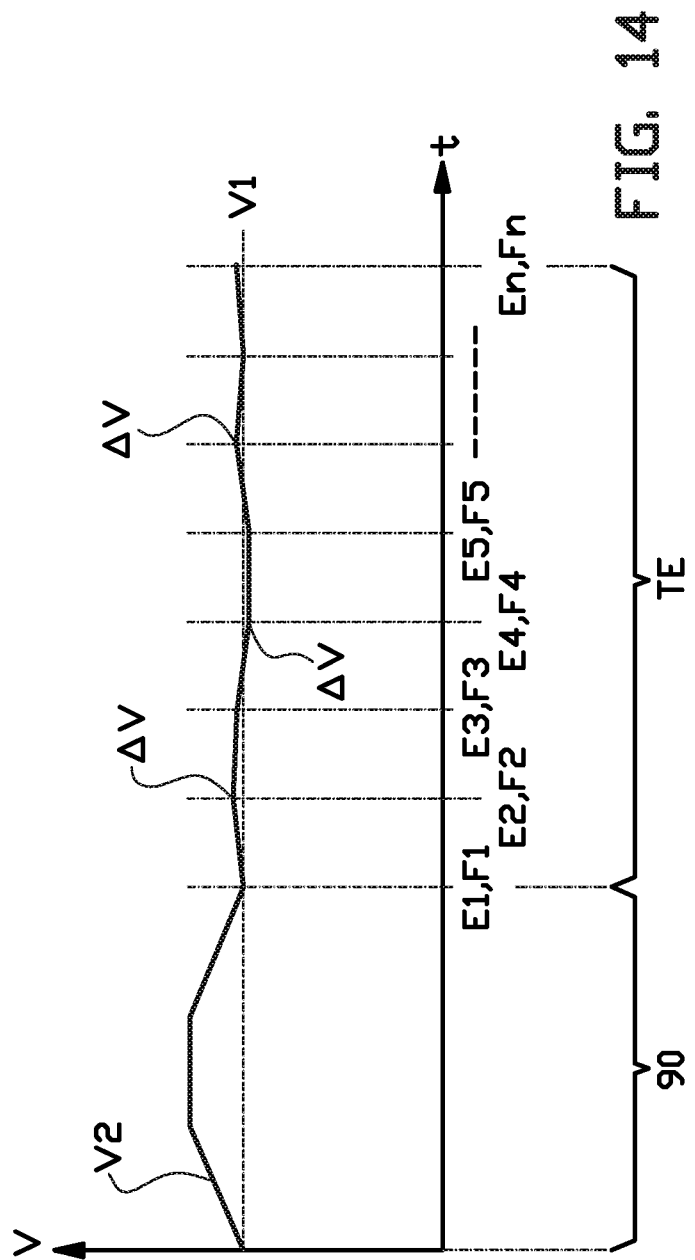

METHOD AND ASSEMBLY FOR APPLYING A TIRE COMPONENT TO A DRUM

BACKGROUND

The invention relates to a method and an assembly for applying a tire component, in particular a breaker ply, to a drum.

WO 2015/069102 A1 discloses a method for centering a tire component, in particular a breaker ply, with respect to a drum. The method comprises the steps of placing the tire component on a first conveyor and conveying it towards a second conveyor, determining the position of a first longitudinal edge, transversely moving the first conveyor and thereby aligning the first longitudinal edge along a first reference on the second conveyor, conveying the tire component from the first conveyor onto the second conveyor while determining the position of a second longitudinal edge, wherein the tire component has a center between the first longitudinal edge and the second longitudinal edge, conveying the tire component from the second conveyor towards the drum, laterally moving the drum to align the center of the tire component with a center of a desired application position of the tire component on the drum, and conveying the tire component from the second conveyor onto the drum.

The known method further comprises the step of determining for a number of stored lateral positions of the leading edge, at a predetermined distance upstream of the stored lateral position, the lateral position of the trailing edge, and aligning said lateral position of the trailing edge to the stored lateral position of the leading edge by transversely moving the first conveyor with respect to the second conveyor.

Through said transverse movement of the first conveyor, any given point on the trailing edge can be corrected to a lateral position at which the length of the tire component between the lateral positions as measured at the leading edge and the trailing edge matches the predetermined distance. The predetermined distance corresponds to the desired circumferential length of the tire component when the tire component is applied to the drum.

Although the method as described above improves the splicing, the length of the trailing edge between two consecutive lateral positions may not always be equal to the length of the leading edge between the same lateral positions at the leading edge. Hence, by laterally moving the trailing edge, a difference in length of the trailing edge with respect to the leading edge may be inadvertently stretched or compressed when splicing, resulting in unpredictable behavior, such as waving.

It is an object of the present invention to provide a method and an assembly for applying a tire component, in particular a breaker ply, to a drum, wherein the splicing can be improved.

SUMMARY OF THE INVENTION

According to a first aspect, the invention provides a method for applying a tire component, in particular a breaker ply, from an apply member onto a receiving member, wherein the tire component comprises a leading edge, a trailing edge and a first longitudinal edge and a second longitudinal edge extending between the leading edge and the trailing edge, wherein the method comprises the steps of;

a) receiving the tire component on the apply member;
b) detecting a plurality of leading endpoints at the leading edge and detecting, for each leading endpoint, a trailing endpoint at the trailing edge that together with the respective leading endpoint forms a pair of endpoints;
c) determining the relative positioning between the leading endpoint and the trailing endpoint for each pair of endpoints;
d) driving the apply member at an apply speed to transfer the tire component in a transfer direction onto the receiving member while driving the receiving member at a receiving speed; and
e) splicing the trailing edge to the leading edge on the building drum;
wherein the ratio between the apply speed and the receiving speed is adjusted for each pair of endpoints during the transfer in step d) in the order in which said pairs of endpoints are spliced in step e) to improve the relative positioning of each pair of endpoints for splicing.

Preferably, the receiving member is the building drum, wherein the building drum is rotated at the receiving speed.

By adjusting the aforementioned ratio, the tire component can be locally stretched or compressed between the pair of endpoints to reposition said pair of endpoints for splicing, e.g. to close an open splice or to reduce an overlapping splice.

Preferably, the leading endpoints and the trailing endpoints are distributed over the leading edge and the trailing edge, respectively, with the same interval. Hence, the trailing endpoints can be accurately spliced to the leading endpoints without compressing or stretching the intervals between the respective endpoints on the leading edge and the trailing edge.

In another preferred embodiment the tire component has a length between the leading endpoint and the trailing endpoint of each pair of endpoints on the apply member, wherein said length without adjustment of the ratio will either result in an overlapping splice, an open splice or a butt-splice on the building drum, wherein the ratio is adjusted such that:

the receiving speed is higher than the apply speed when transferring one of the pairs of endpoints which would result in an open splice; and the receiving speed is lower than the apply speed when transferring one of the pairs of endpoints which would result in an overlapping splice. Hence, any openings in the splice can be reduced while any overlap in the splice can be decreased, thereby improving the positioning of each pair of endpoints for splicing.

In another embodiment the leading endpoint and the trailing endpoint of at least one of the pairs of endpoints are spaced apart on the apply member in a lateral direction transverse or perpendicular to the transfer direction, wherein during step d) the apply member and the receiving member are moved relative to each other in the lateral direction when transferring said at least one pair of endpoints to reduce the spacing between the leading endpoint and the trailing endpoint of said at least one pair of endpoints in said lateral direction. By providing the ratio between the apply speed and the receiving speed and by providing the relative lateral movement between the apply member and the receiving member, the relative positioning of the pair of endpoints can be manipulated both in the transfer direction and the lateral direction. Hence, the trailing endpoint can be moved towards the leading endpoint of the respective pair across a path with vector components in both the transfer direction and the lateral direction. Effectively, the trailing endpoint may follow a curvature or be warped towards its respective leading endpoint with respect to the previously applied trailing endpoint. The correction of the ratio and the relative lateral movement can work particularly well when the leading endpoints and the trailing endpoints are distributed over the leading edge and the trailing edge, respectively, with the same interval, in accordance with one of the previously described embodiments.

In a preferred embodiment the tire component comprises a main part extending in a longitudinal direction between the leading end and the trailing end, wherein the first longitudinal edge forms a leading tip with the leading edge, wherein the ratio is adjusted during the transfer of the main part from the apply member onto the receiving member to splice the leading tip to the trailing edge. By ensuring that the leading tip is spliced to the trailing edge, the endpoints at or near said leading tip are substantially fixed, while the rest of the endpoints can still be manipulated. Hence, the initial ratio between the apply speed and the receiving speed can be calculated to make sure that at least these endpoints provide a good splice on the building drum.

In a further embodiment the ratio between the apply speed and the receiving speed is adjusted when the trailing endpoints are transferred from the apply member onto the receiving member. Hence, the relative positioning can be corrected when most of the tire component has already been applied to the receiving member. The part of the trailing edge that is not yet applied to the receiving member becomes increasingly smaller with the application of each subsequent trailing endpoint, thereby allowing for accurate control of the relative positioning in said part of the trailing edge that is not yet applied with respect to the part of the trailing edge that is already applied.

In a further embodiment the trailing endpoints are applied to the receiving member one by one, wherein directly after the application of one of the trailing endpoints to the receiving member the ratio between the apply speed and the receiving speed is adjusted for the next trailing endpoint that is to be applied to the receiving member. Again, as soon as the previous trailing endpoint has been applied the relative positioning between said previous trailing endpoint and the leading endpoint of the same pair of endpoints is substantially fixed on the receiving member and the next of the trailing endpoints that is not yet fixed can be accurately manipulated with respect to the previously applied trailing endpoint.

In a further embodiment the ratio between the apply speed and the receiving speed is adjusted by adjusting the receiving speed. By adjusting the receiving speed while keeping the apply speed constant, the tire component can be easily stretched or compressed. Moreover, it can be prevented that the adjustment of the ratio impacts any processes upstream of the apply conveyor, e.g. the transfer of the tire component from a supply conveyor onto the apply conveyor.

In a further embodiment the leading endpoints and the trailing endpoints are detected on the apply member. Hence, the relative positioning can be calculated prior to the transfer of the tire component from the apply conveyor onto the receiving member.

In a preferred embodiment the apply member is an apply conveyor. The tire component can be easily measured on the flat surface of the apply conveyor.

In an alternative embodiment the apply member is a transfer drum. The transfer drum can be used to transfer tire components such as chafers to the receiving member.

According to a second aspect, the invention provides an assembly for applying a tire component, in particular a breaker ply, from an apply member onto a building drum, wherein the tire component comprises a leading edge, a trailing edge and a first longitudinal edge and a second longitudinal edge extending between the leading edge and the trailing edge, wherein the leading edge is arranged to be spliced to the trailing edge on a tire building drum, wherein the assembly comprises the apply member, the receiving member, an apply member drive for driving the apply member in a transfer direction at an apply speed and a receiving member drive for driving the receiving member at a receiving speed, wherein the assembly further comprises an apply sensor for detecting a plurality of leading endpoints at the leading edge and for detecting, for each leading endpoint, a trailing endpoint at the trailing edge that together with the respective leading endpoint forms a pair of endpoints, wherein the assembly is provided with a control system for determining the relative positioning between the leading endpoint and the trailing endpoint for each pair of endpoints, wherein the control system is operationally connected to the apply member drive and the receiving member drive for adjusting the ratio between the apply speed and the receiving speed for each pair of endpoints during the transfer of the tire component from the apply member to the receiving member in the order in which said pairs of endpoints are spliced to improve the relative positioning of each pair of endpoints for splicing.

Preferably, the receiving member is the building drum, wherein the receiving member drive is a drum drive for rotating the building drum at the receiving speed.

The assembly according to the second aspect of the invention comprises a control system that is arranged for executing the steps as described in the aforementioned method. The assembly and its embodiments have the same technical advantages as the method and its respective embodiments. The technical advantages will therefore not be repeated hereafter.

In a preferred embodiment the control system is arranged for distributing the leading endpoints and the trailing endpoints over the leading edge and the trailing edge, respectively, with the same interval.

In a further preferred embodiment the tire component has a length between the leading endpoint and the trailing endpoint of each pair of endpoints on the apply member, wherein said length without adjustment of the ratio will either result in an overlapping splice, an open splice or a butt-splice on the building drum, wherein the control system is arranged for adjusting ratio such that:
 the receiving speed is higher than the speed when transferring one of the pairs of endpoints which would result in an open splice; and
 the receiving speed is lower than the speed when transferring one of the pairs of endpoints which would result in an overlapping splice.

In another embodiment the leading endpoint and the trailing endpoint of at least one of the pairs of endpoints are spaced apart on the apply member in a lateral direction transverse or perpendicular to the transfer direction, wherein the apply member and the receiving member are movable relative to each other in the lateral direction when transferring said at least one pair of endpoints to reduce the spacing between the leading endpoint and the trailing endpoint of said at least one pair of endpoints in said lateral direction.

In another embodiment the apply sensor is arranged at or above the apply member for detecting the leading endpoints and the trailing endpoints on the apply member.

Preferably, the apply member is an apply conveyor. Alternatively, the apply member is a transfer drum.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIG. 14 shows a possible control scheme of the ratio between the speed of the apply conveyor and the speed of the drum set out against the time.

DETAILED DESCRIPTION OF THE INVENTION

Figure 1:
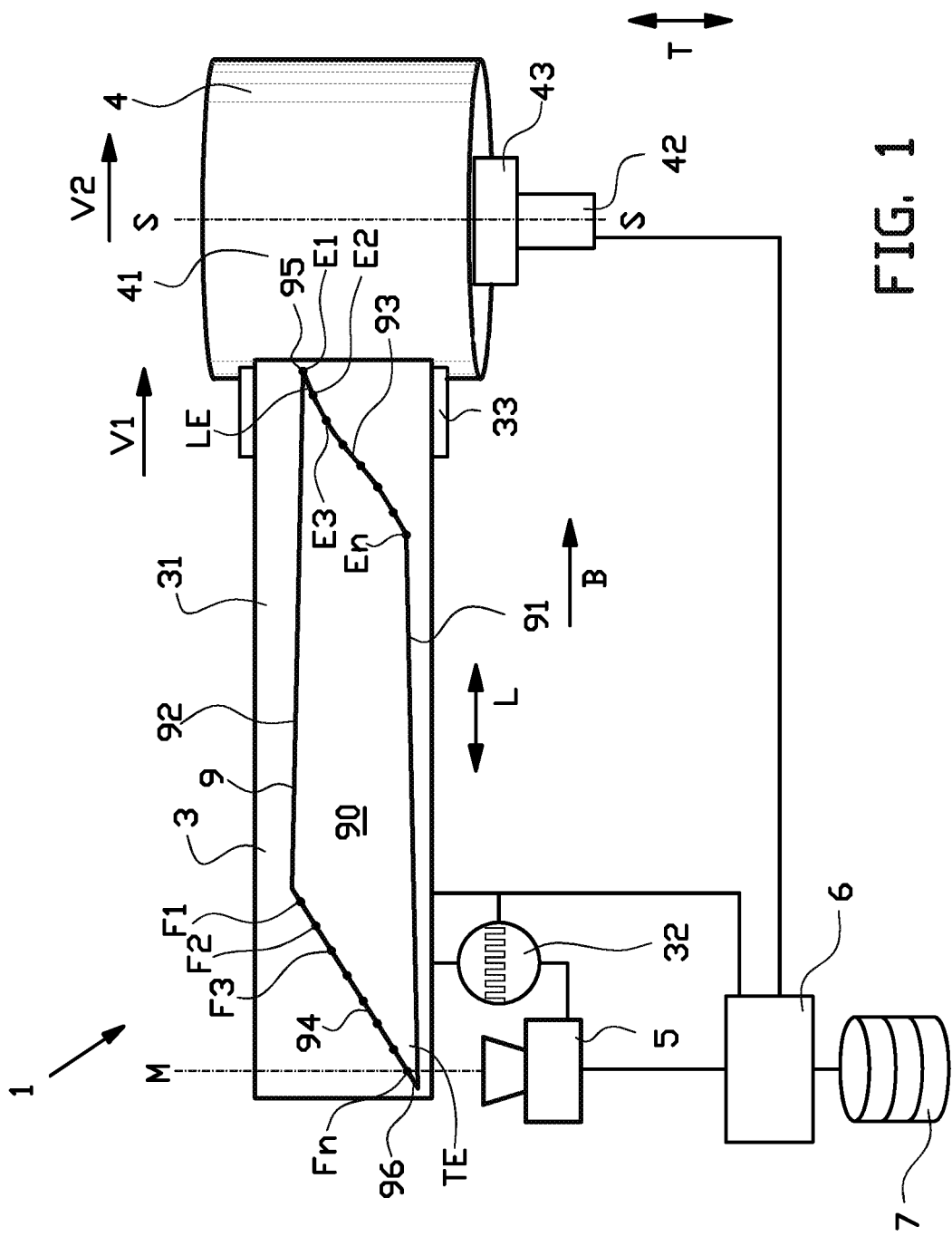
FIG. 1 shows an assembly with a building drum and an apply member in the form of an apply conveyor for applying a tire component onto said building drum, according to a first embodiment of the invention.

FIG. 1 shows an assembly 1 with an apply member 3 in the form of an apply conveyor and a receiving member in the form of a building drum 4, according to an exemplary first embodiment of the invention. The assembly 1 is used in a method for applying a tire component 9 to the building drum 4. In this exemplary embodiment, the tire component 9 is a belt component such as a breaker ply 9 or a chafer (not shown).

The tire component 9 has a first longitudinal edge 91 and a second longitudinal edge 92 substantially parallel to the first longitudinal edge 91. The tire component 9 is provided with a leading end LE, an opposite trailing end TE and a main part 90 extending in a longitudinal direction L between the leading end LE and the trailing end TE. The leading end LE and the trailing end TE have been cut under substantially the same oblique angle with respect to the longitudinal edges 91, 92 to obtain a substantially parallelogram-like outer contour for the tire component 9. In this example, the main part 90 is substantially rectangular in shape. Due to the angle, the tire component 9 comprises a leading edge 93 and a trailing edge 94 extending under an oblique angle with respect to the transfer direction B of the apply member 3, parallel to the supply conveyor surface. At the distal ends of the leading end LE and the trailing end 1E, the leading edge 93 and the trailing edge 94 meet the longitudinal edges 92, 91 under a sharp angle in a leading tip 95 and a trailing tip 96, respectively.

The tire component 9 may be supplied onto the apply conveyor 3 with a supply conveyor, e.g. the first conveyor as disclosed in WO 2015/069102 A1. Said supply conveyor may be movable in a lateral direction T transverse to the transfer direction B of the apply conveyor 3 to align the leading tip 95 along a reference line on the apply conveyor 3. Said known pre-alignment along a reference line can be used to further improve the centering and/or positioning of the tire component 9 with respect to the building drum 4.

In this exemplary embodiment, the apply member 3 is a roller-type conveyor with rollers forming an apply member surface 31. In operation, the apply member 3 is arranged for conveying the tire component 9 in a feed direction or transfer direction B towards the building drum 4. The tire component 9 is received on said apply member surface 31 with its longitudinal direction L extending parallel or substantially parallel to the transfer direction B. The apply member 3 is preferably provided with magnets or other means for retaining the tire component 9 on the apply member surface 31.

The apply member 3 comprises an apply member drive 33 for driving the apply member surface 31 in the transfer direction B of the apply member 3 at an adjustable apply speed V1. At the apply member 3, the assembly 1 is provided with an encoder 32 for emitting regular pulses for a predetermined increment or distance that the tire component 9 moves in the transfer direction B on the apply member 3.

The building drum 4 comprises a circumferential surface 41 for receiving the tire component 9. The building drum 4 is rotatably arranged about a rotational center axis S, concentric to the circumferential surface 41. The assembly 1 is provided with a lateral drum drive 42 for moving the building drum 4 sideways, transverse or laterally with respect to the transfer direction B of the apply member 3, in particular back and forth in a lateral or transverse direction T, transverse or perpendicular to the transfer direction B and/or parallel to the rotational axis S of the building drum 4. The assembly 1 is further provided with a drum drive 43 for rotating the building drum 4 about the rotational center axis S at an adjustable receiving speed or drum speed V2.

The method according to the present invention differs from the method disclosed in WO 2015/069102 A1 in that the relative positioning of the leading edge 93 and the trailing edge 94 is improved for splicing by correcting the lengths or distances D1-Dn of the tire component 9 (see FIGS. 11 and 12) in the longitudinal direction L between a plurality of detected leading endpoints E1, E2, E3, ..., En and a plurality of detected trailing endpoints F1, F2, F3, ..., Fn. More in particular, tire component 9 is locally stretched or compressed in the longitudinal direction L to close an open splice or to reduce an overlapping splice, respectively.

To detect the endpoints E1-En, F1-Fn on the apply member 3, the assembly 1 is provided with an apply sensor 5. In particular, the apply sensor 5 is located at or above the apply member surface 31 to detect the endpoints E1-En, F1-Fn at the apply member surface 31. The apply sensor 5 is preferably arranged for optically detecting the contours of the tire component 9 along an apply measuring line M when the tire component 9 is fed onto the apply member 3 in the transfer direction B. The apply sensor 5 may be an optical camera with image recognition capabilities, a camera in combination with one or more projection means (single laser line or laser triangulation) or other means for detecting contours or edges of the tire component 9. The apply sensor 5 is operationally coupled to the encoder 32 of the apply member 3, such that measurements can be taken at each pulse of the encoder 32. The assembly 1 further comprises a control system 6 that is operationally connected to the apply sensor 5 for processing the signals from the apply sensor 5 and for controlling the assembly 1 based on said processed signals.

The method for applying the tire component 9 from the apply member 3 onto the building drum 4 will be elucidated hereafter with reference to FIGS. 1-10.

In the situation as shown in FIG. 1, the leading endpoints E1, E2, E3, ..., En and the trailing endpoints F1, F2, F3, ..., Fn have been detected as soon as the leading end LE passes the apply measuring line M in the transfer direction B. For each leading endpoint E1, E2, E3, ..., En, a trailing endpoint F1, F2, F3, ..., Fn is detected that forms a pair of endpoints E1-En, F1-Fn with said respective leading endpoint E1, E2, E3, ..., En. Position data of the endpoints E1-En, F1-Fn is stored in a memory 7 for use by the control system 6.

Figure 3:
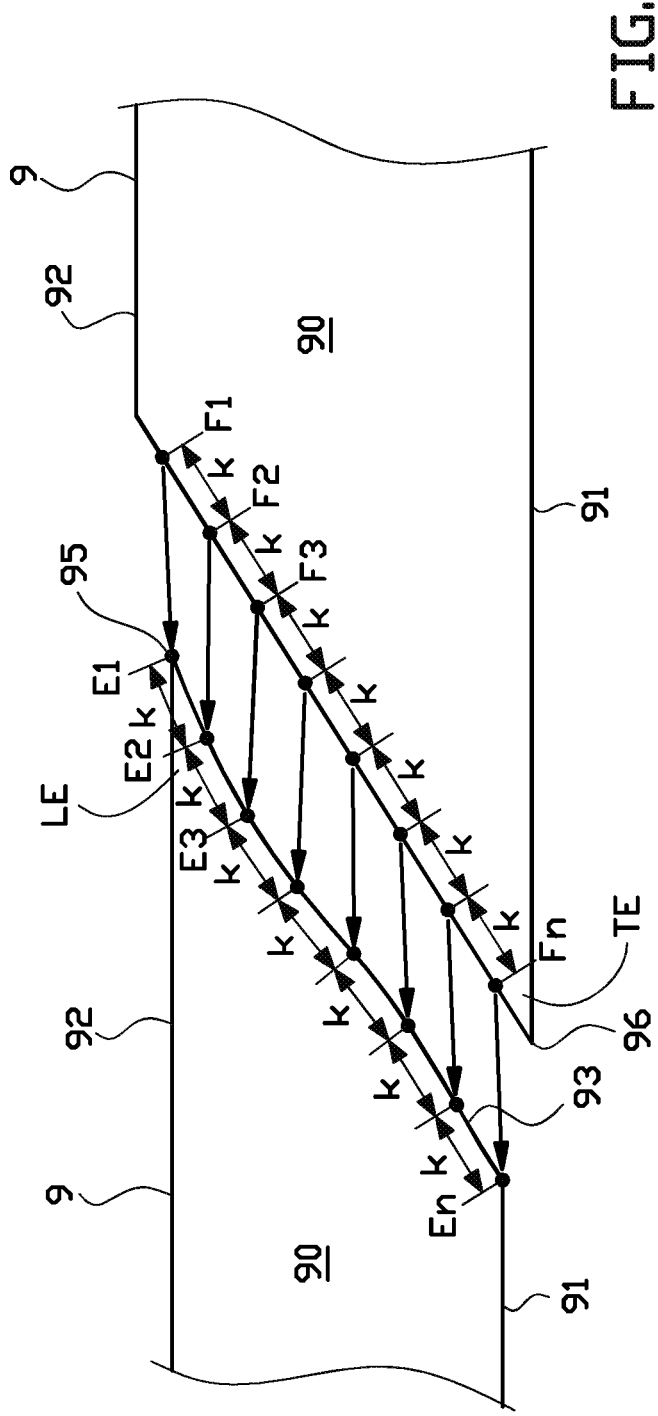
FIG. 3 shows the theoretical splice formed by the measured tire component on the building drum.

The leading endpoints E1, E2, E3, ..., En and the trailing endpoints F1, F2, F3, Fn may be paired in different ways. As shown in FIG. 3, leading endpoints E1, E2, E3, ..., En may be distributed equally over the length of the leading edge 93, which results in an interval k. Said interval k is subsequently used to plot the trailing endpoints F1, F2, F3, Fn onto the trailing edge 94. If the trailing edge 94 has a length that is longer than the length of the leading edge 93, then the length spanned by the plotted trailing endpoints F1, F2, F3, Fn on said trailing edge 94 is centered with respect to the length of the trailing edge 94, so that an equal lengths remain on either side of the trailing edge 94 outside of the outer trailing endpoints F1, Fn. This manner of pairing is preferred as the interval k between each set of two directly subsequent trailing endpoints F1, F2, F3, Fn on the trailing edge 94 is equal or substantially equal to the interval k between the set of the two respective, directly subsequent leading endpoints E1, E2, E3, ..., En on the leading edge 93. Hence, the trailing endpoints F1, F2, F3, Fn can be accurately spliced to the leading endpoints E1, E2, E3, ..., En without compressing or stretching the intervals K between the respective endpoints E1-En, F1-Fn on the leading edge 93 and the trailing edge 94.

Alternatively, the trailing endpoints F1, F2, F3, ..., Fn may be measured in-line with a respective one of the leading endpoints E1, E2, E3, ..., En in the transfer direction B of the apply conveyor 3. It will be apparent to one skilled in the art that different ways of pairing trailing endpoints F1, F2, F3, ..., Fn to leading endpoints E1, E2, E3, ..., En are possible.

Figure 2:
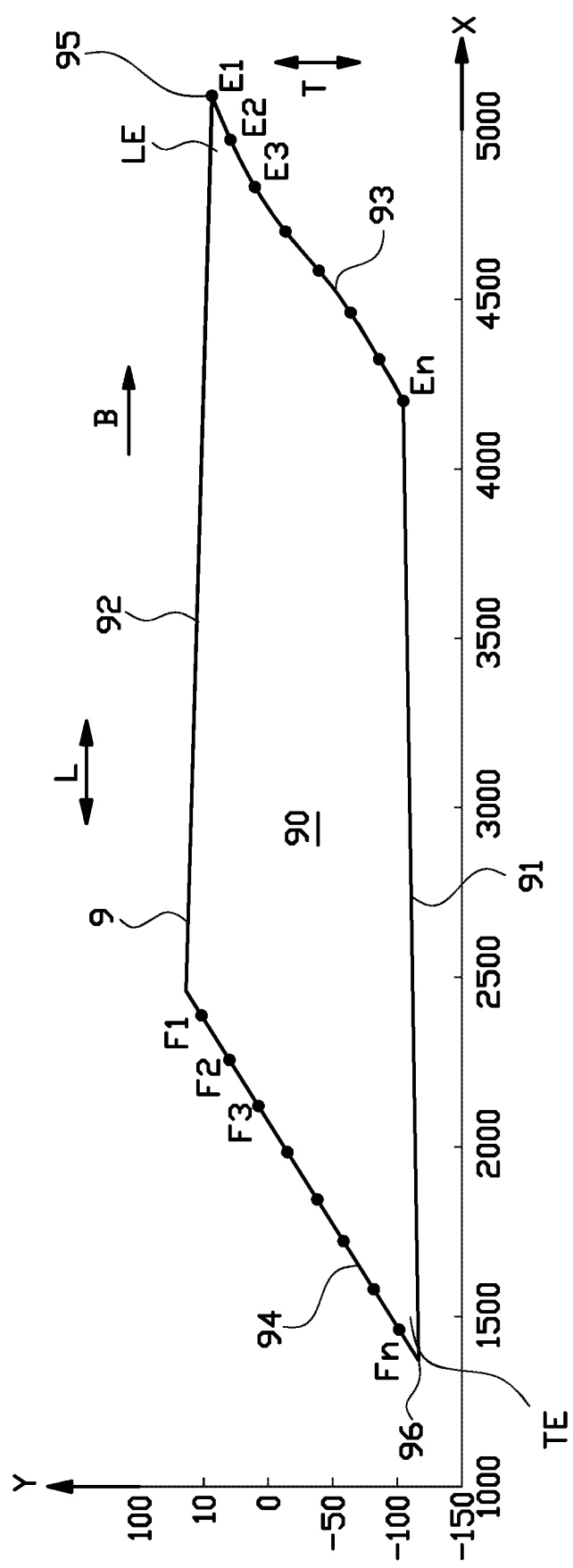
FIG. 2 show the measurements taken when the tire component is on the apply conveyor.
Figure 4:
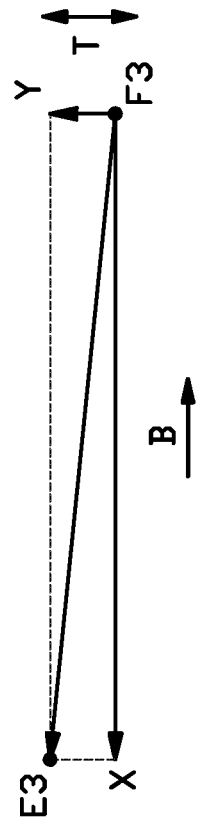
FIG. 4 show a detail of the theoretical splice according to circle IV in FIG. 3 and the adjustments needed to improve said theoretical splice.

FIG. 2 schematically shows the measurements taken when the tire component 9 has been placed onto the apply member 3. The position data that is stored in the memory 7 as shown in FIGS. 3 and 4 may contain X and Y coordinates corresponding to the positions of the endpoints E1-En, F1-Fn in the longitudinal direction L and the lateral direction T, respectively. Said position data may be plotted onto the X-axis and the Y-axis of a chart that is schematically shown in FIG. 2. The values on the X-axis and the Y-axis are in millimeters. Hence, the tire component 9 as detected is roughly 160 millimeters wide and 3500 millimetres long. In this exemplary embodiment, five leading endpoints E1, E2, E3, ..., En and five trailing endpoints F1, F2, F3, ..., Fn are detected. It will be apparent to one skilled in the art that the number of endpoints can be varied. In practice, the endpoints E1-En, F1-Fn will probably be detected at an interval of one or only a few millimeters.

In the example as shown, the leading edge 93 is non-uniform and/or non-linear with respect to the shape of the trailing edge 94. It is noted that the leading edge 93 in FIG. 2 has an exaggerated non-linear shape to more clearly illustrate the working principle of the invention. In practice, the deviations may be less pronounced, e.g. in the range of only a few millimeters.

With the position data from the leading endpoints E1, E2, E3, ..., En and the trailing endpoints F1, F2, F3, ..., Fn stored in the memory 7, the control system 6 can now determine the relative positioning of the leading endpoints E1, E2, E3, ..., En with respect to the trailing endpoints F1, F2, F3, ..., Fn. In particular, the control system 6 may calculate, based on a given circumferential length of the circumferential surface 41 of the building drum 4, a theoretical splice when the trailing edge 94 is spliced to the leading edge 93 on the building drum 4 in the condition as measured on the apply member 3, hence without any correction to said relative positioning. Said theoretical splice is shown in FIG. 3.

As shown in FIG. 3, the theoretical splice is an open splice across the entire length of both the leading edge 93 and the trailing edge 94. Hence, in order to close said open splice, the tire component 9 has to be stretched. However, due to the non-linear shape of the leading edge 93, the amount of stretching should not be constant. Instead, the amount of stretching can be calculated locally between each pair of a leading endpoint E1, E2, E3, ..., En and a trailing endpoint F1, F2, F3, ..., Fn to improve the quality of the splicing.

Figure 5:
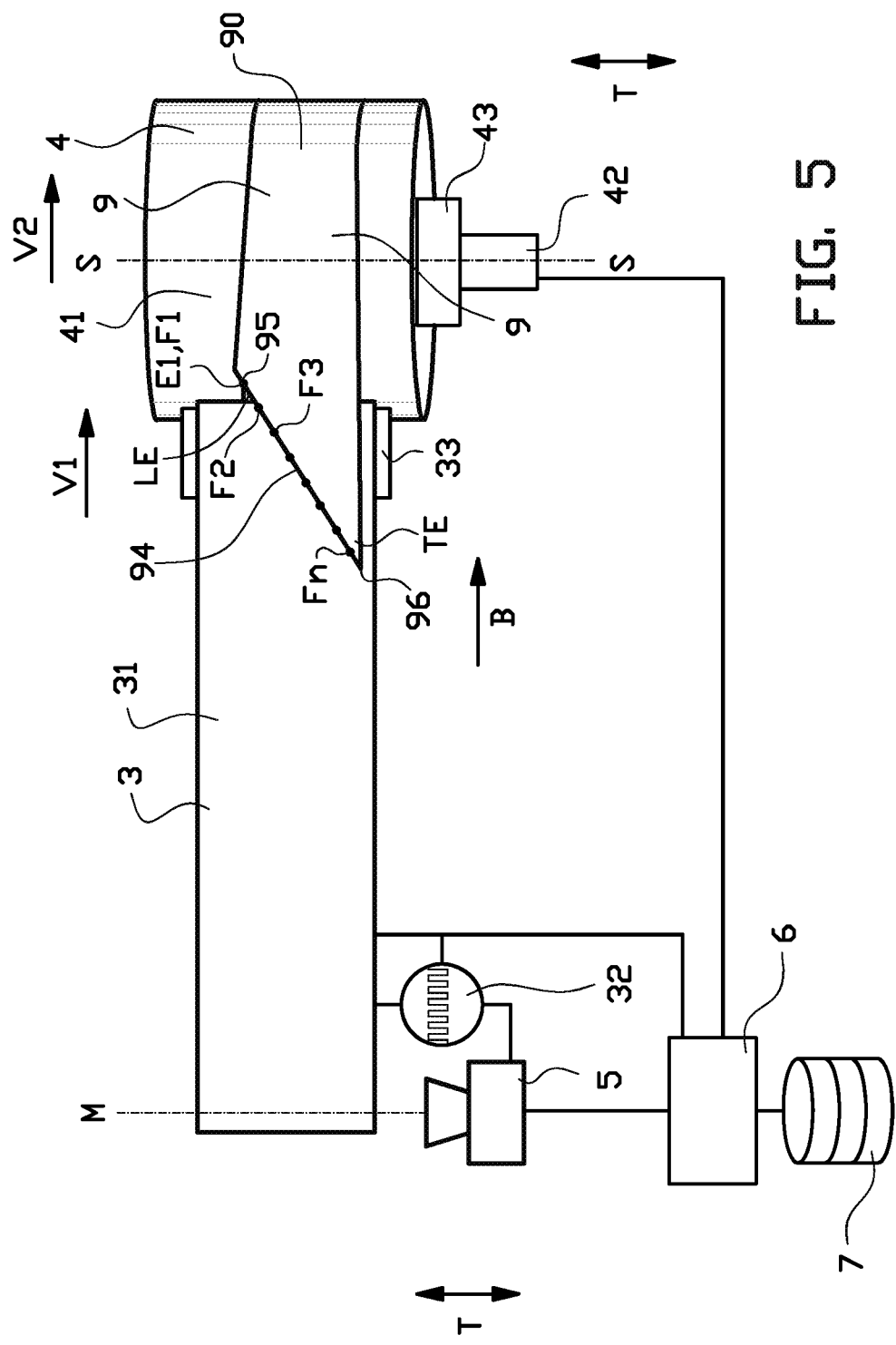
FIGS. 5, 6, 7 and 8 show the steps of the method for applying the tire component onto the drum.
Figure 6:
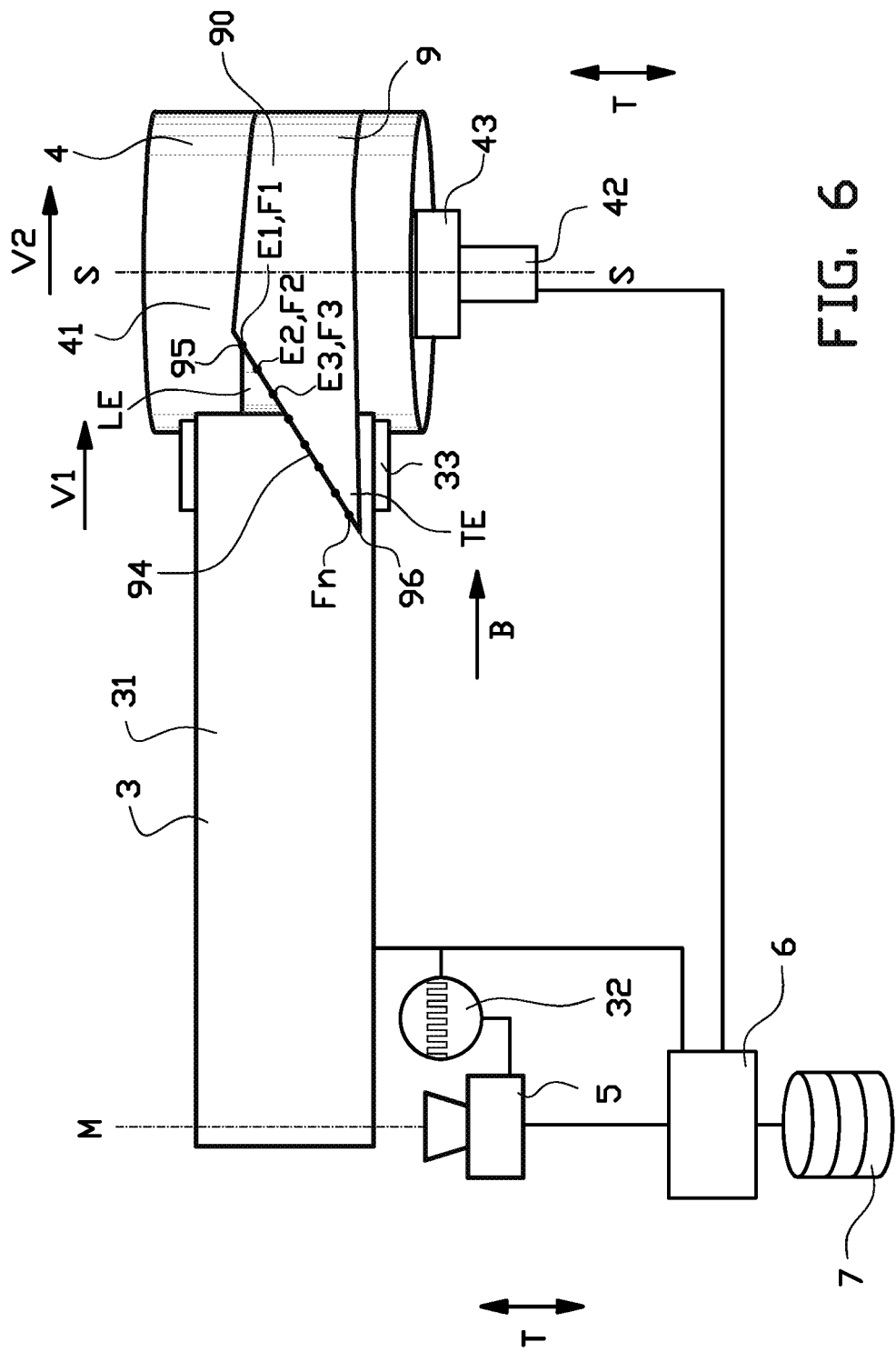
Figure 7:
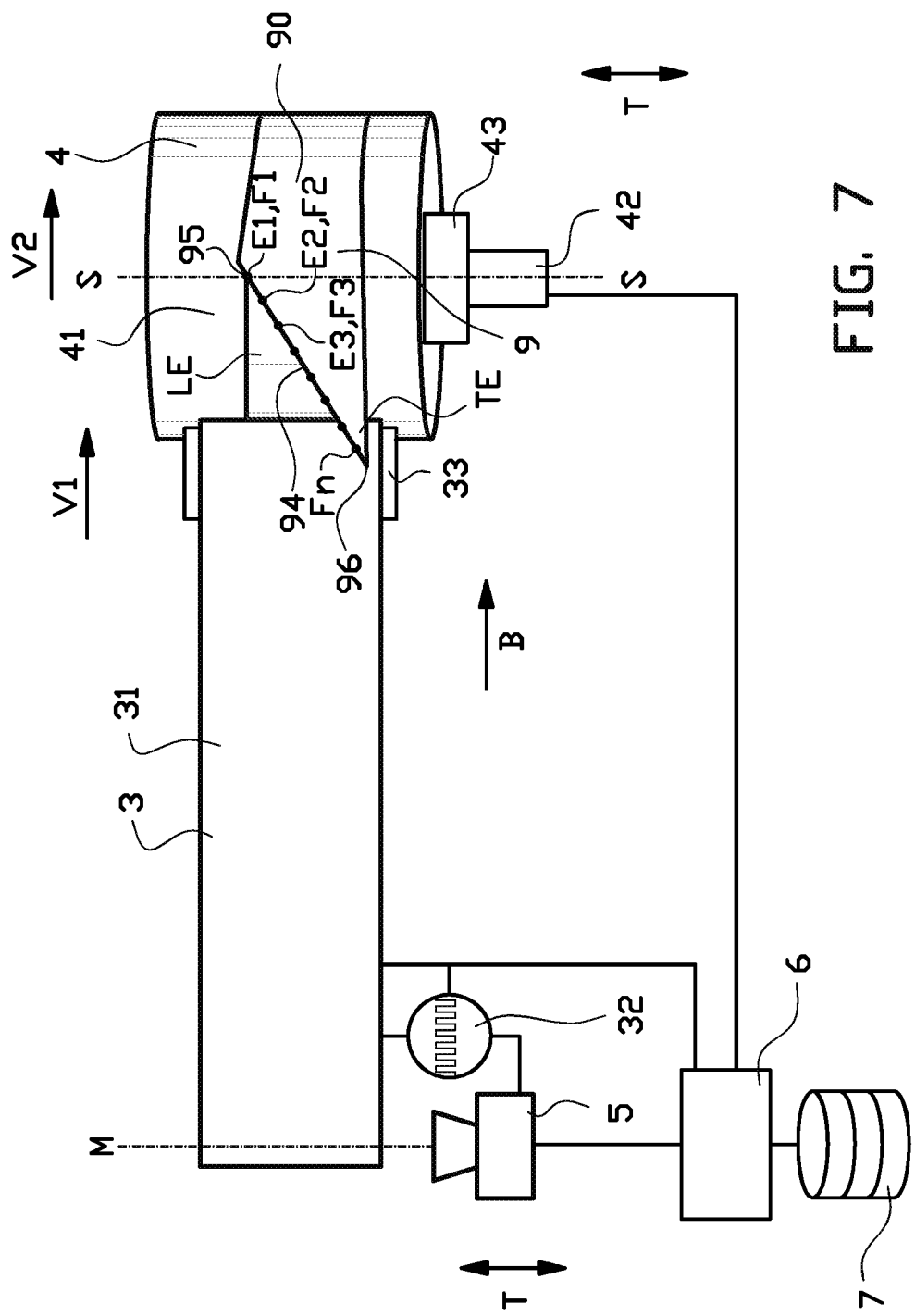
Figure 8:
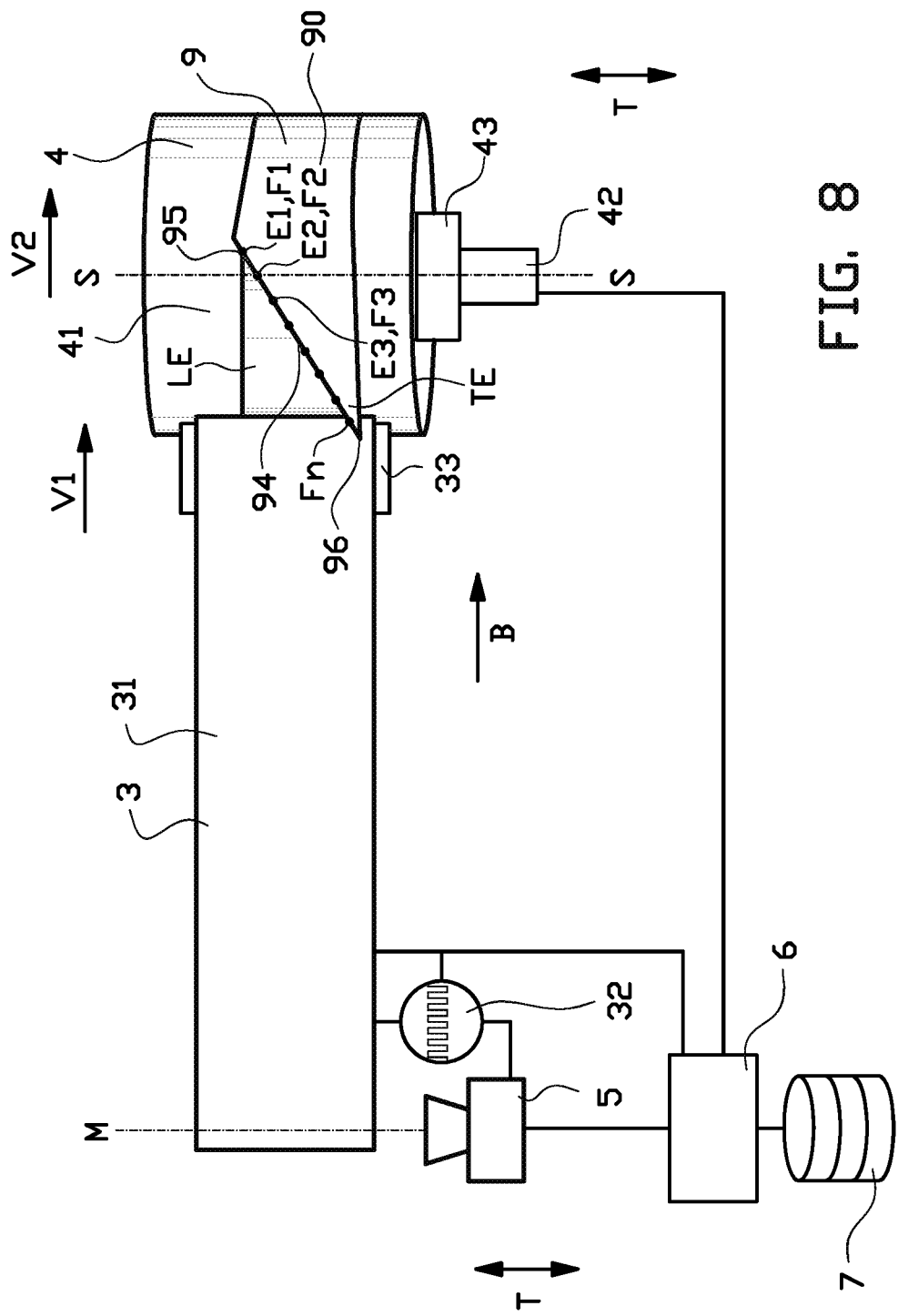

In FIGS. 5-8, the steps of applying the tire component 9 to the building drum 4 are shown. In FIG. 5, the tire component 9 has been conveyed by the apply member 3 at an apply speed V1 in the transfer direction B of said apply member 3 onto the building drum 4. The building drum 4 is simultaneously rotated at a receiving speed V2. The ratio between the apply speed V1 and the receiving speed V2 determines whether the length of the tire component 9 is stretched, compressed or kept constant during the transfer from the apply member 3 to the building drum 4. In FIG. 5, the leading end LE and most of the main body 90 of the tire component 9 has already been applied onto the building drum 4. The ratio during the transfer of this first part of the tire component 9 is set based on the relative positioning as determined in FIGS. 2 and 3 between the pair of endpoints E1, F1 closest to or at the second longitudinal edge 92.

In FIG. 5, the trailing endpoint F1 that is closest to or at the second longitudinal edge 92 has just been applied onto the building drum 4. The next, directly subsequent or directly consecutive trailing endpoint F2 along the trailing edge 94 is however still on the apply member 3 and/or is yet to be transferred to the building drum 4. Hence, with the length of the tire component 9 between the already applied pair of endpoints E1, F1 in FIG. 4 already applied to the building drum 4, the length between the next pair of endpoints E2, F2 can be manipulated and/or corrected to close the splice. This process is repeated for each next pair of endpoints E3, F3; En, Fn along the trailing edge 94 in FIGS. 6, 7 and 8 until the tire component 9 is completely applied onto the building drum 4.

As soon as or directly after the application of one of the trailing endpoints F1, F2, F3, ..., Fn to the building drum 4, the ratio between the apply speed V1 and the receiving speed V2 is adjusted for the next trailing endpoint F1, F2, F3, ..., Fn that is to be applied to the building drum 4 in the order in which said endpoints F1, F2, F3, ..., Fn are applied onto the building drum 4. In particular, the ratio is adjusted such that the receiving speed V2 is higher than the speed V1 when transferring one of the endpoints E1-En, F1-Fn which—without adjustment—would result in an open splice and the ratio is adjusted such that the receiving speed V2 is lower than the apply speed V1 when transferring one of the endpoints E1-En, F1-Fn which—without adjustment—would result in an overlapping splice. Hence, the tire component 9 can be stretched or compressed locally during the transfer in the increasingly smaller part of the trailing end TE that has not yet been applied to the building drum 4 with respect to the part of the trailing end TE that has already been applied to the building drum 4.

Preferably, the ratio between the apply speed V1 and the receiving speed V2 is adjusted by adjusting the receiving speed V2. Alternatively or additionally, the apply speed V1 may be adjusted.

Figure 9:
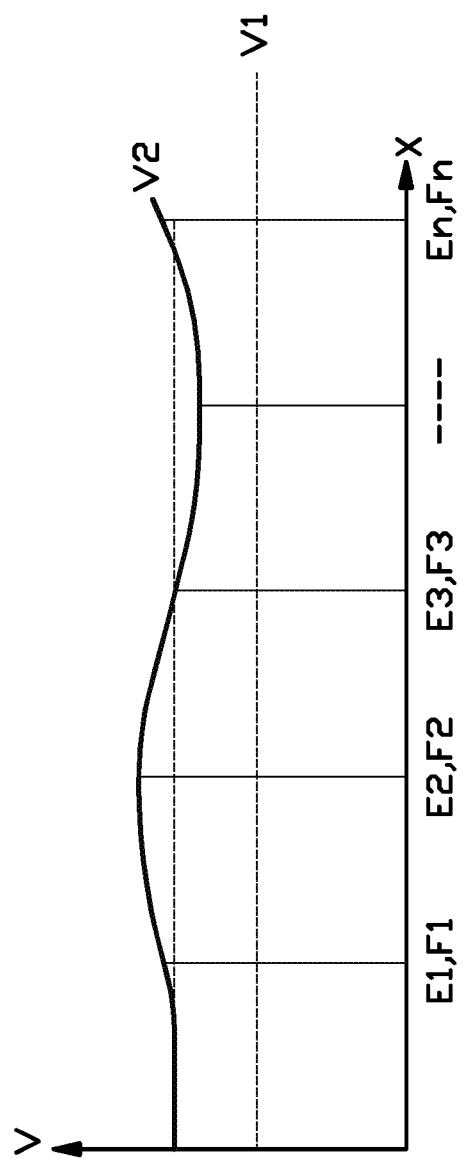
FIG. 9 shows a possible control scheme of the ratio between the speed of the apply conveyor and the speed of the drum for each length measured between a pair of an leading endpoint and a trailing endpoint.

FIG. 9 shows a possible control scheme of the receiving speed V2 during the application of the tire component 9. In particular, it is shown that, in this particular example, the receiving speed V2 is higher than the apply speed V1 during the entire body transfer to close the theoretical open splice between the first trailing endpoint F1 and the first leading endpoint E1, as shown in FIG. 3. The receiving speed V2 is set at an initial speed prior to the transfer of the first trailing endpoint F1 to close the splice between the first leading endpoint E1 and the first trailing endpoint F1. In this example, the first leading endpoint E1 is located at the leading tip 95. Hence, the ratio adjustment results in the leading tip 95 being spliced to the trailing edge 94. Subsequently, the speed is increased as the second leading endpoint E2 and the second trailing endpoint F2 are further apart than the first leading endpoint E1 and the first trailing endpoint F1. The speed is then again reduced to the initial speed for the third leading endpoint E3 and the third trailing endpoint F3, and so on, to obtain an optimal splice across all endpoints E1-En, F1-Fn. Hence, by varying and/or adjusting the receiving speed V2, and thus the ratio between the receiving speed V2 and the apply speed V1, the positions of the trailing endpoints F1, F2, F3, . . . , Fn can be manipulated locally across the width of the trailing edge 94.

The control scheme as shown in FIG. 9 represents the absolute speed difference between the apply speed V1 and the receiving speed V2 for the length (x) measured by the apply sensor 5 between each pair of endpoints E1, F1; E2, F2; En, Fn on the apply member 3. When setting out the same control scheme against the time (t), FIG. 14 shows that the main part 90 of the tire component 9 may be transferred first at an initial speed difference to stretch or compress said main part 90 and simultaneously obtain an optimal splice between the first leading endpoint E1 and the first trailing endpoint F1. In particular, if the tire component 9 is too short and will result in an open splice, then the receiving speed V2 is initially set higher than the apply speed V1, at least during the transfer of the main part 90 of the tire component 9, as shown in the control scheme of FIG. 14. If the tire component 9 is too long and will result in an overlapping splice, then the receiving speed V2 is initially set lower than the apply speed V1, as shown in dashed lines in FIG. 14. Hence, a substantial part of the theoretical open splice or overlapping splice can already be corrected during the initial transfer of the main part based on the initial spacing or overlap between the first leading endpoint E1 and the first trailing endpoint F1. Any remaining gaps or overlaps between the other pairs of endpoints E2, F2; E3, F3; . . . ; En, Fn can subsequently be corrected by controlling relatively small delta speed differences (ΔV) to bring the respective pairs of endpoints E2, F2; E3, F3; . . . ; En, Fn together.

Figure 15A:
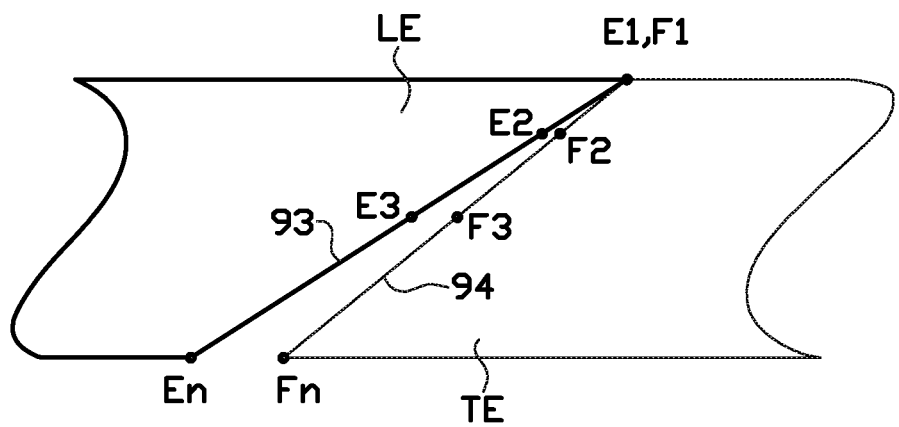
FIGS. 15A, 16A and 17A show different open splices
Figure 15B:
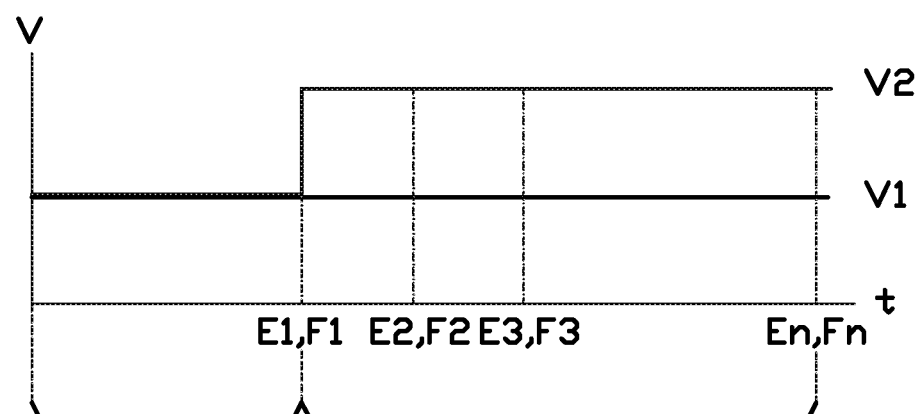
FIGS. 15B, 16B and 17B show the corresponding control schemes for closing the respective open splices.
Figure 16A:
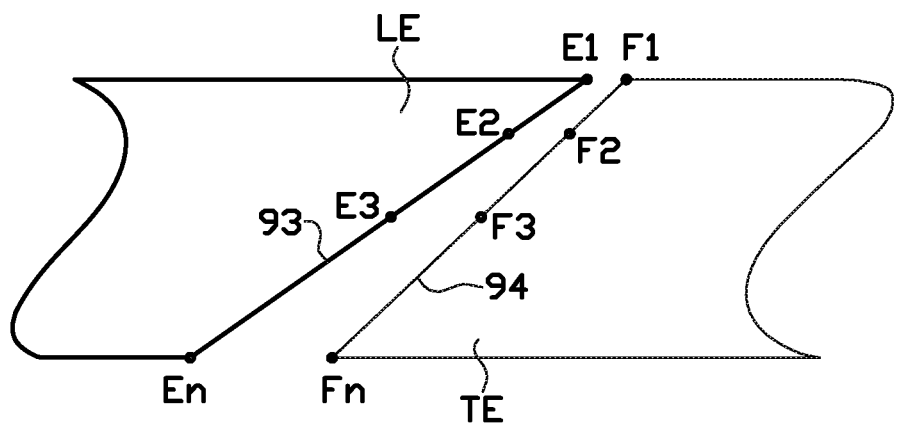
Figure 17A:
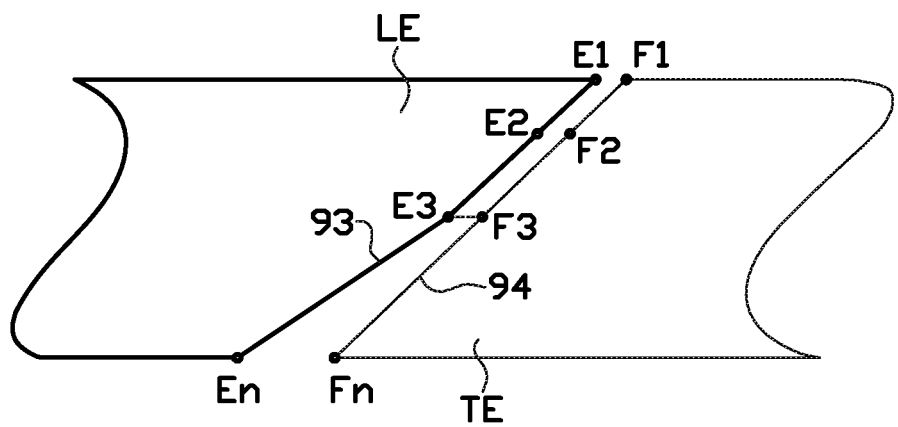

FIGS. 15A, 16A and 17A show different open splices in a simplified manner. In particular, FIG. 15A shows an open splice where the first pair of endpoints E1, F1 is closed and the remaining pairs of endpoints E2, F2; E3, F3; . . . ; En, Fn are increasingly spaced apart. E.g. said open splice diverges from the first pair of endpoints E1, F1. The corresponding control scheme in FIG. 15B shows that initially, during the transfer of the main body 90, there is no need for a speed difference. Hence, the ratio between the apply speed V1 and the receiving speed V2 is 1:1. However, directly after the first pair of endpoints E1, F1 has been spliced, the receiving speed V2 is increased to stretch the length (x) between the remaining pairs of endpoints E2, F2; E3, F3; . . . ; En, Fn.

Figure 16B:
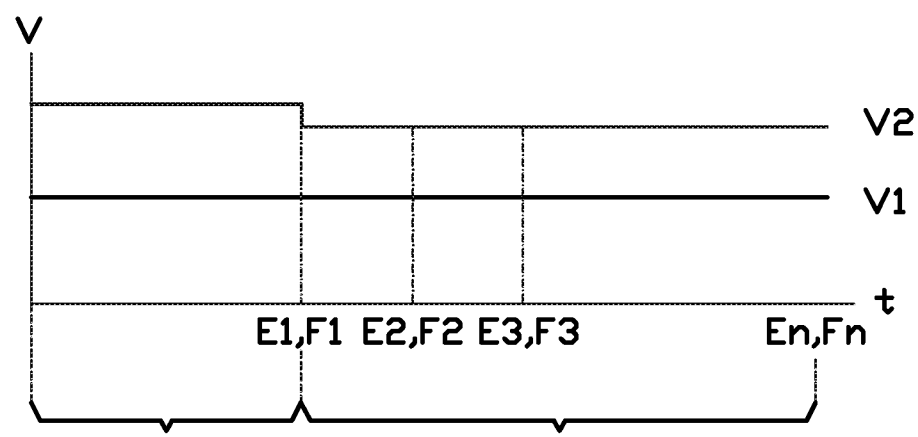

FIG. 16A shows a similar diverging splice. However, this diverging splice is not closed but open between the first pair of endpoints E1, F1. Hence, in the corresponding control scheme as shown in FIG. 16B, the receiving speed V2 is higher than the apply speed V1 during the transfer of the main body 90 to close the splice at the first pair of endpoints E1, F1. After the splice has been closed at the first pair of endpoints E1, F1, the receiving speed V2 can be reduced slightly, but is still higher than the apply speed V1, to close the splice at the remaining pairs of endpoints E2, F2; E3, F3; . . . ; En, Fn in the same way as in FIG. 15B.

Figure 17B:
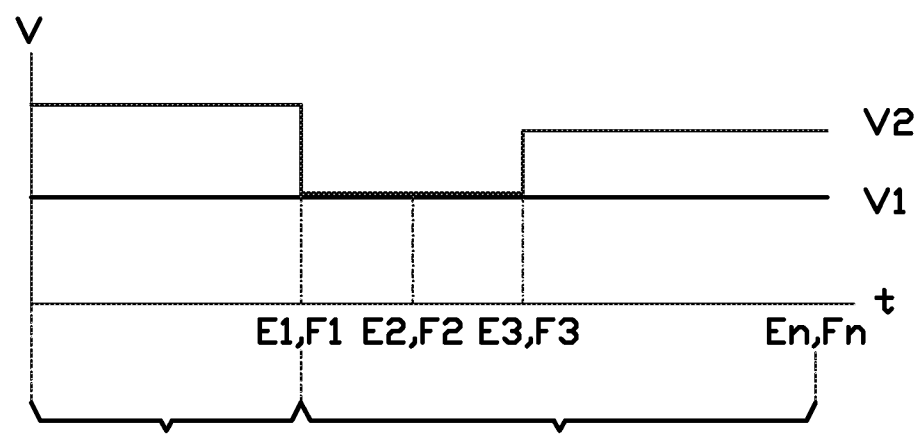

FIG. 17A shows an open splice with a leading edge 93 and a trailing edge 94 that initially run parallel to each other from the first pair of endpoints E1, F1 up to the third pair of endpoints E3, F3 but then diverges towards the last endpoint En, Fn. The corresponding control scheme, as shown in FIG. 17B, features a first part in which the receiving speed V2 is higher than the apply speed V1 during the transfer of the main body 90 to close the open splice between the parallel edges 93, 94. Then, as the open splice is closed between the first pair of endpoints E1, F1 and the third pair of endpoints E3, F3, there is no need for a speed difference. Only after the splice starts to diverge, the receiving speed V2 is increased again.

As best seen in FIGS. 3 and 4, the leading endpoint E1, E2, E3, . . . , En and the trailing endpoint F1, F2, F3, . . . , Fn in the theoretical open splice may not only be spaced apart in the longitudinal direction L, but also in the transverse direction T. Preferably, the apply member 3 and/or the building drum 4 can be moved laterally or in the lateral direction T with respect to the transfer direction B of the apply member 3 during the transfer of one or more of the trailing endpoints F1, F2, F3, . . . , Fn to reduce the spacing between the leading endpoint E1, E2, E3, . . . , En and the trailing endpoint F1, F2, F3, . . . , Fn in the lateral direction T.

By providing the ratio between the apply speed V2 and the receiving speed V1 and by providing the relative lateral movement between the apply member 3 and the building drum 4, the relative positioning of each pair of endpoints can be manipulated both in the transfer direction B (or the longitudinal direction L) and the lateral direction T. Hence, each trailing endpoint F1, F2, F3, . . . , Fn can be moved towards the leading endpoint E1, E2, E3, . . . , En of the respective pair across a path with vector components (shown as X and Y in FIG. 4) in both the transfer direction B and the lateral direction T. Effectively, the trailing endpoint F1, F2, F3, . . . , Fn may follow a curvature or be warped towards its respective leading endpoint E1, E2, E3, . . . , En with respect to the previously applied trailing endpoint F1, F2, F3, . . . , Fn. The direction in which to move each trailing endpoint F1, F2, F3, . . . , Fn is shown schematically with arrows in FIG. 3.

It is noted that in FIG. 2, only the leading edge 93 is depicted as non-uniform or non-linear edge. In practice, the leading edge 93, the trailing edge 94 or both the leading edge 93 and the trailing edge 94 may be non-linear. The distance correction should work equally well for each of these cases. In case of a non-uniform or non-linear leading edge 93, the correction will simply result in the shape of the trailing edge 94 being corrected to the non-linear shape of the already applied leading edge 93. Hence, both the leading edge 93 and the trailing edge 94 may be non-linear after the correction, but they should at least have the same or substantially the same non-linear shape to ensure a proper splice.

Figure 10:
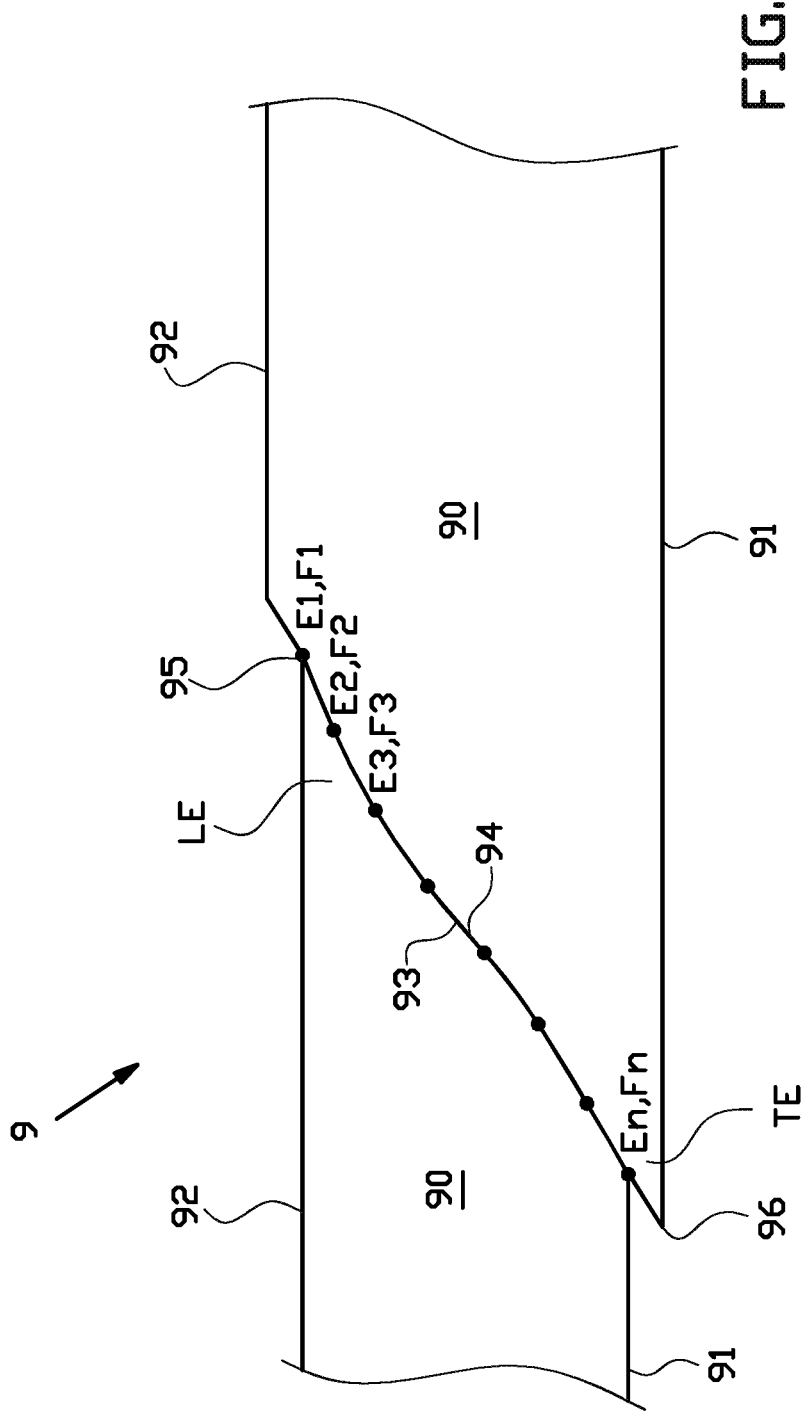
FIG. 10 shows the actual splice of the tire component after application to the drum.

FIG. 10 shows the shape of the leading edge 93 and the trailing edge 94 after the adjustments according to the aforementioned steps. The tire component 9 is stretched and contracted in accordance with the control scheme of FIG. 9 and/or moved laterally or in the lateral direction T to correct the position of the trailing endpoints F1, F2, F3, . . . , Fn in the longitudinal direction L to match the positioning of the leading endpoints E1, E2, E3, . . . , En.

Figure 11:
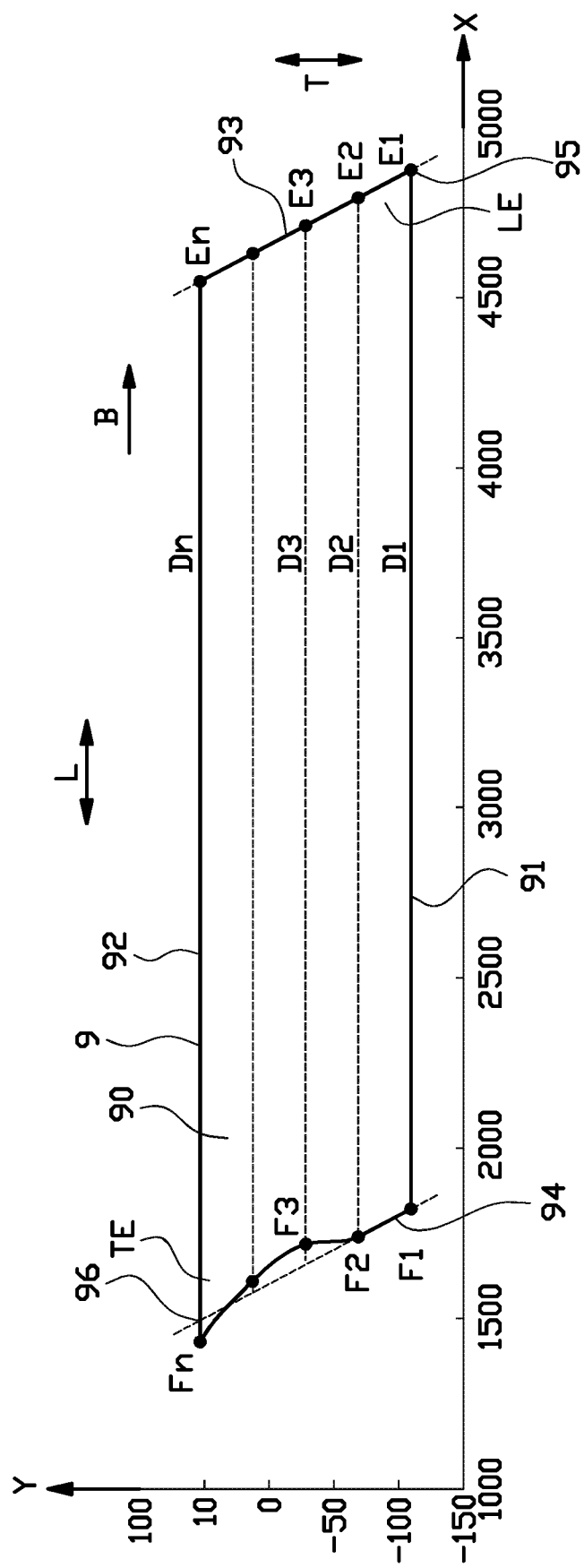
FIGS. 11 and 12 show a different use of the measurements taken when the tire component is on the apply conveyor.
Figure 12:
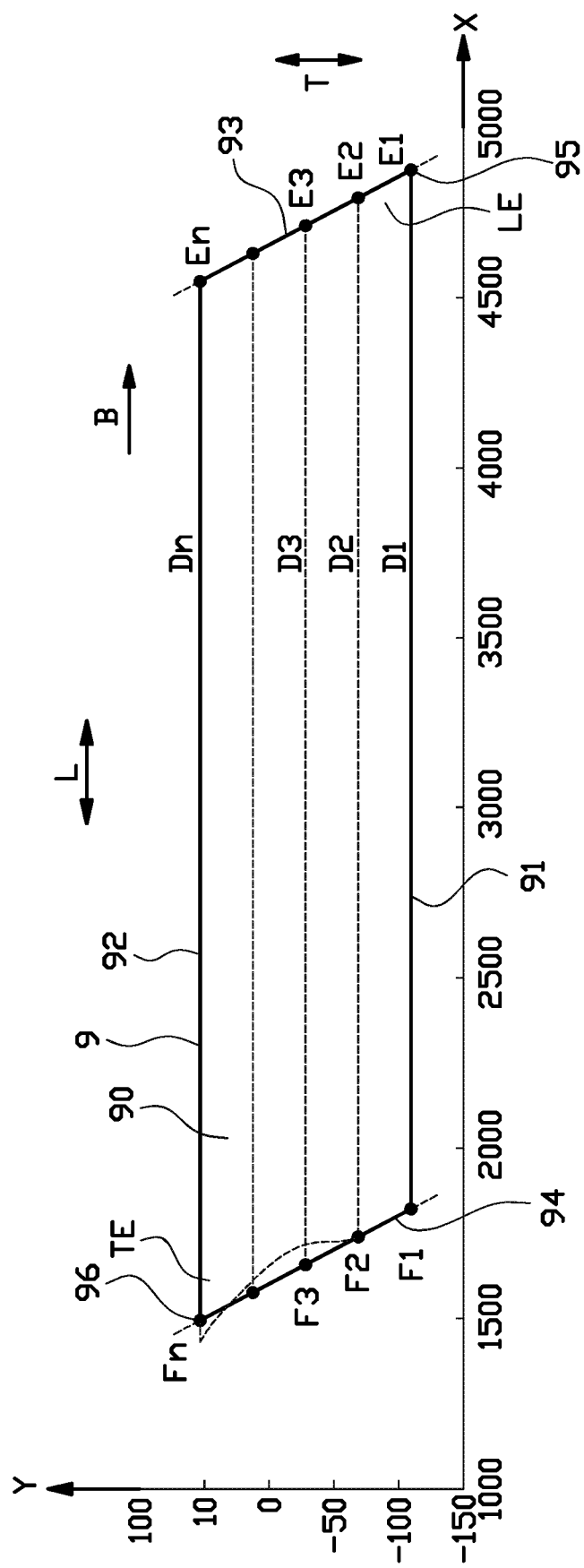

FIGS. 11 and 12 show a different use of the measurements taken in FIG. 2. Instead of calculating the theoretical open splice of FIG. 3, the measurements may be used to calculate the distances D1, D2, D3, . . . , Dn between each pair of endpoints E1-En, F1-Fn. This is most easily accomplished when detecting the trailing endpoints F1-Fn in-line with their respective leading endpoints E1-En in the longitudinal direction L or the transfer direction B. When the distances D1, D2, D3, . . . , Dn are determined, one can calculate the difference of said distances D1, D2, D3, . . . , Dn with respect to a target distance D0, e.g. the circumferential length of the circumferential surface 41 of the building drum 4. The control system 6 can subsequently calculate the ratios required during the transfer of each pair of endpoints E1-En, F1-Fn to match the distance D1, D2, D3, . . . , Dn as measured between said pair of endpoints E1-En, F1-Fn to the target distance.

Figure 13:
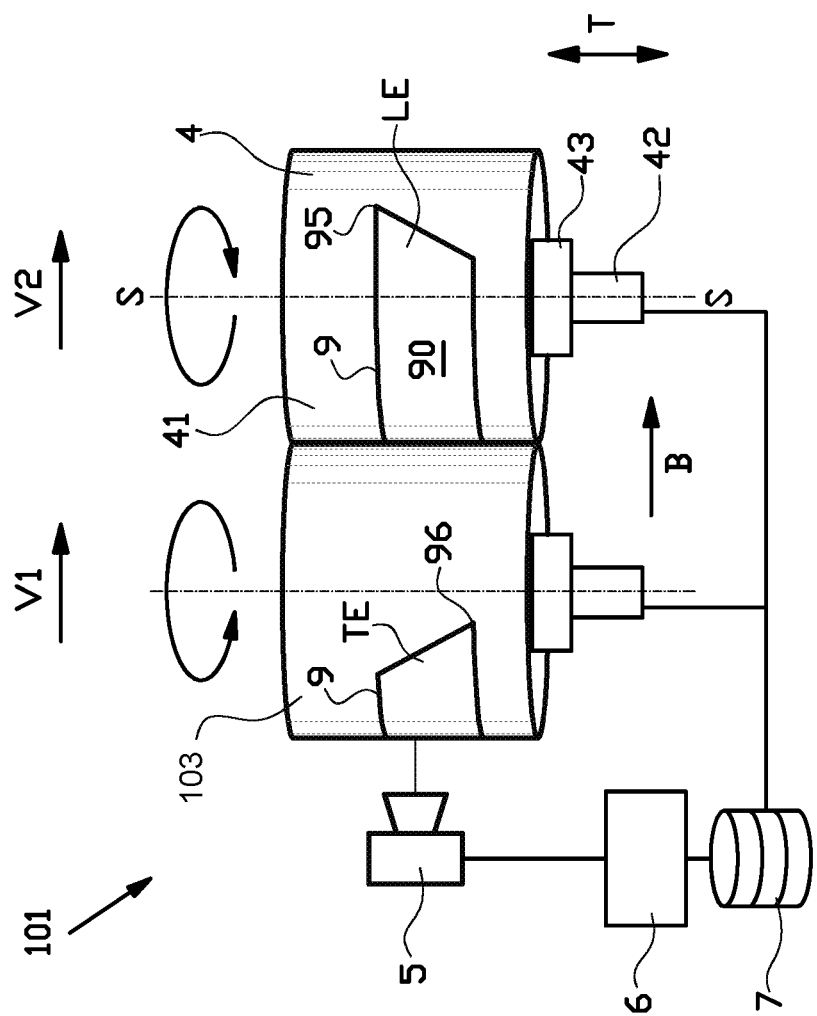
FIG. 13 shows an alternative assembly with a building drum and an apply member in the form of a transfer drum for applying the tire component onto the building drum according to a second embodiment of the invention.

FIG. 13 shows an alternative assembly 101 according to an exemplary second embodiment of the invention. The alternative assembly 101 differs from the previously discussed assembly 1 in that the apply member 103 is not an apply conveyor. Instead, a transfer drum 103 is used to apply the tire component 9 onto the building drum 4. The apply sensor 5 is arranged for detecting the endpoints E1-En, F1-Fn on said transfer drum 103. The drum drives of the respective drums 4, 103 are controlled to adjust the ratio between the apply speed V1 and the receiving speed V2 in the same manner as the adjustment of the ratio in the previously described embodiment. Moreover, the transfer drum 103 and the building drum 4 may be moved with respect to each other in the lateral direction T in a similar way as the lateral movement between the apply conveyor 3 and the drum 4 in the previously described embodiment to further optimize the splicing.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

For example, in the aforementioned embodiments, the receiving member is the drum 4. However, in an alternative embodiment, a separate receiving member may be provided, e.g. in the form of an intermediate conveyor or conveyor belt, to receive the tire component 9 from the apply member 3, 103 before transferring the tire component 9 to the drum 4. Said separate receiving member may be arranged to convey the tire component 9 in the same transfer direction B onto the drum 4.

The invention claimed is:

1. A method for applying a tire component from an apply member onto a receiving member, wherein the tire component comprises a leading edge, a trailing edge and a first longitudinal edge and a second longitudinal edge extending between the leading edge and the trailing edge, wherein the method comprises the steps of:
   a) receiving the tire component on the apply member;
   b) detecting a plurality of leading endpoints at the leading edge and detecting, for each leading endpoint, a trailing endpoint at the trailing edge that together with the respective leading endpoint forms a pair of endpoints;
   c) determining a relative positioning between the leading endpoint and the trailing endpoint for each pair of endpoints;
   d) driving the apply member at an apply speed to transfer the tire component in a transfer direction onto the receiving member while driving the receiving member at a receiving speed; and
   e) splicing the trailing edge to the leading edge on a building drum;
   wherein a ratio between the apply speed and the receiving speed is adjusted for each pair of endpoints during the transfer in step d) in the order in which said pairs of endpoints are spliced in step e) to improve the relative positioning of each pair of endpoints for splicing.

2. The method according to claim 1, wherein the receiving member is the building drum, wherein the building drum is rotated at the receiving speed.

3. The method according to claim 1, wherein the leading endpoints and the trailing endpoints are distributed over the leading edge and the trailing edge, respectively, with the same interval.

4. The method according to claim 2, wherein the tire component has a length between the leading endpoint and the trailing endpoint of each pair of endpoints on the apply member, wherein said length without adjustment of the ratio will either result in an overlapping splice, an open splice or a butt-splice on the building drum, wherein the ratio is adjusted such that:
   the drum speed is higher than the apply speed when transferring one of the pairs of endpoints which would result in an open splice; and
   the drum speed is lower than the apply speed when transferring one of the pairs of endpoints which would result in an overlapping splice.

5. The method according to claim 1, wherein the leading endpoint and the trailing endpoint of at least one of the pairs of endpoints are spaced apart on the apply member in a lateral direction transverse or perpendicular to the transfer direction, wherein during step d) the apply member and the receiving member are moved relative to each other in the lateral direction when transferring said at least one pair of endpoints to reduce the spacing between the leading endpoint and the trailing endpoint of said at least one pair of endpoints in said lateral direction.

6. The method according to claim 1, wherein the tire component comprises a main part extending in a longitudinal direction between the leading end and the trailing end, wherein the second longitudinal edge forms a leading tip with the leading edge, wherein the ratio is adjusted during the transfer of the main part from the apply member onto the receiving member to splice the leading tip to the trailing edge.

7. The method according to claim 1, wherein the ratio between the apply speed and the receiving speed is adjusted when the trailing endpoints are transferred from the apply member onto the receiving member.

8. The method according to claim 7, wherein the trailing endpoints are applied to the receiving member one by one, wherein directly after the application of one of the trailing endpoints to the receiving member the ratio between the apply speed and the receiving speed is adjusted for the next trailing endpoint that is to be applied to the receiving member.

9. The method according to claim 1, wherein the ratio between the apply speed and the receiving speed is adjusted by adjusting the receiving speed.

10. The method according to claim 1, wherein the leading endpoints and the trailing endpoints are detected on the apply member.

11. The method according to claim 1, wherein the apply member is an apply conveyor.

12. The method according to claim 1, wherein the apply member is a transfer drum.

13. An assembly for applying a tire component from an apply member onto a receiving member as claimed in claim 1, wherein the tire component comprises a leading edge, a trailing edge and a first longitudinal edge and a second longitudinal edge extending between the leading edge and the trailing edge, wherein the leading edge is arranged to be spliced to the trailing edge on a tire building drum, wherein the assembly comprises the apply member, the receiving member, an apply member drive for driving the apply member in a transfer direction at an apply speed and a receiving member drive for driving the receiving member at a receiving speed, wherein the assembly further comprises an apply sensor for detecting a plurality of leading endpoints at the leading edge and for detecting, for each leading endpoint, a trailing endpoint at the trailing edge that together with the respective leading endpoint forms a pair of endpoints, wherein the assembly is provided with a control system configured for determining the relative positioning between the leading endpoint and the trailing endpoint for each pair of endpoints, wherein the control system is operationally connected to the apply member drive and the receiving member and is configured drive for adjusting the ratio between the apply speed and the receiving speed for each pair of endpoints during the transfer of the tire component from the apply member to the receiving member in the order in which said pairs of endpoints are spliced to improve the relative positioning of each pair of endpoints for splicing.

14. The assembly according to claim 13, wherein the receiving member is the building drum, wherein the receiving member drive is a drum drive for rotating the building drum at the receiving speed.

15. The assembly according to claim 13, wherein the control system is arranged for distributing the leading endpoints and the trailing endpoints over the leading edge and the trailing edge, respectively, with the same interval.

16. The assembly according to claim 14, wherein the tire component has a length between the leading endpoint and the trailing endpoint of each pair of endpoints on the apply member, wherein said length without adjustment of the ratio will either result in an overlapping splice, an open splice or a butt-splice on the building drum, wherein the control system is arranged for adjusting ratio such that:

the receiving speed is higher than the apply speed when transferring one of the pairs of endpoints which would result in an open splice; and the receiving speed is lower than the apply speed when transferring one of the pairs of endpoints which would result in an overlapping splice.

17. The assembly according to claim 14, wherein the leading endpoint and the trailing endpoint of at least one of the pairs of endpoints are spaced apart on the apply member in a lateral direction transverse or perpendicular to the transfer direction, wherein the apply member and the receiving member are movable relative to each other in the lateral direction when transferring said at least one pair of endpoints to reduce the spacing between the leading endpoint and the trailing endpoint of said at least one pair of endpoints in said lateral direction.

18. The assembly according to claim 14, wherein the apply sensor is arranged at or above the apply member for detecting the leading endpoints and the trailing endpoints on the apply member.

19. The assembly according to claim 14, wherein the apply member is an apply conveyor.

20. The assembly according to claim 14, wherein the apply member is a transfer drum.

21. A method for applying a tire component from an apply member onto a receiving member, wherein the tire component comprises a leading edge, a trailing edge and a first longitudinal edge and a second longitudinal edge extending between the leading edge and the trailing edge, and wherein the leading edge is non-uniform or non-linear with respect to the shape of the trailing edge, wherein the method comprises the steps of:

a) receiving the tire component on the apply member;

b) detecting a plurality of leading endpoints at the leading edge, wherein said leading endpoints are distributed over the length of the leading edge at equal intervals;

c) for each leading endpoint, determining a trailing endpoint at the trailing edge that together with the respective leading endpoint forms a pair of endpoints, such that the interval between each set of two directly subsequent trailing endpoints on the trailing edge is equal to the interval between the set of the two respective, directly subsequent leading endpoints on the leading edge;

d) determining a relative positioning between the leading endpoint and the trailing endpoint for each pair of endpoints;

e) driving the apply member at an apply speed to transfer the tire component in a transfer direction onto the receiving member while driving the receiving member at a receiving speed; and f) splicing the trailing edge to the leading edge on a building drum;

wherein the leading endpoint and the trailing endpoint of at least one of the pairs of endpoints are spaced apart on the apply member in a lateral direction transverse or perpendicular to the transfer direction, wherein during step e) the apply member and the receiving member are moved relative to each other in the lateral direction when transferring said at least one pair of endpoints to reduce the spacing between the leading endpoint and the trailing endpoint of said at least one pair of endpoints in said lateral direction, and wherein a ratio between the apply speed and the receiving speed is adjusted when transferring said at least one pair of endpoints to improve the relative positioning of the leading endpoint and the trailing endpoint of said at least one pair of endpoints for splicing.

22. The method according to claim 21, wherein the trailing edge has a length that is longer than the length of the leading edge, and wherein the length spanned by the plotted trailing endpoints on said trailing edge is centered with respect to the length of the trailing edge.

23. The method according to claim 22, wherein equal lengths remain on either side of the trailing edge outside of the trailing endpoints.

24. The method according to claim 21, wherein, in step d) an amount of stretch to be applied to the tire component is calculated locally between each pair of a leading endpoint and a trailing endpoint.

25. The method according to claim 21, wherein the receiving member is the building drum, wherein the building drum is rotated at the receiving speed.

26. The method according to claim 25, wherein the tire component has a length between the leading endpoint and the trailing endpoint of each pair of endpoints on the apply member, wherein said length without adjustment of the ratio will either result in an overlapping splice, an open splice or a butt-splice on the building drum, wherein the ratio is adjusted such that:
the drum speed is higher than the apply speed when transferring one of the pairs of endpoints which would result in an open splice; and
the drum speed is lower than the apply speed when transferring one of the pairs of endpoints which would result in an overlapping splice.

27. The method according to claim 21, wherein the tire component comprises a main part extending in a longitudinal direction between the leading end and the trailing end, wherein the second longitudinal edge forms a leading tip with the leading edge, and wherein the ratio is adjusted during the transfer of the main part from the apply member onto the receiving member to splice the leading tip to the trailing edge.

28. The method according to claim 21, wherein the ratio between the apply speed and the receiving speed is adjusted by adjusting the receiving speed.

29. The method according to claim 21, wherein the leading endpoints and the trailing endpoints are detected on the apply member.

30. The method according to claim 21, wherein the apply member is an apply conveyor.

31. The method according to claim 21, wherein the apply member is a transfer drum.

32. A method for applying a tire component from an apply member onto a receiving member, wherein the tire component comprises a leading edge, a trailing edge and a first longitudinal edge and a second longitudinal edge extending between the leading edge and the trailing edge, and wherein the leading edge is non-uniform or non-linear with respect to the shape of the trailing edge, wherein the method comprises the steps of:
a) receiving the tire component on the apply member;
b) detecting a plurality of leading endpoints at the leading edge, wherein said leading endpoints are distributed over the length of the leading edge at equal intervals;
c) for each leading endpoint, determining a trailing endpoint at the trailing edge that together with the respective leading endpoint forms a pair of endpoints, such that the interval between each set of two directly subsequent trailing endpoints on the trailing edge is equal to the interval between the set of the two respective, directly subsequent leading endpoints on the leading edge;
d) determining a relative positioning between the leading endpoint and the trailing endpoint for each pair of endpoints;
e) driving the apply member at an apply speed to transfer the tire component in a transfer direction onto the receiving member while driving the receiving member at a receiving speed; and
f) splicing the trailing edge to the leading edge on a building drum;
wherein the leading endpoint and the trailing endpoint of at least one of the pairs of endpoints are spaced apart on the apply member in a lateral direction transverse or perpendicular to the transfer direction,
wherein during step e) the apply member and the receiving member are moved relative to each other in the lateral direction when transferring said at least one pair of endpoints to reduce the spacing between the leading endpoint and the trailing endpoint of said at least one pair of endpoints in said lateral direction.

33. A method for applying a tire component from an apply member onto a receiving member, wherein the tire component comprises a leading edge, a trailing edge and a first longitudinal edge and a second longitudinal edge extending between the leading edge and the trailing edge, and wherein the leading edge is non-uniform or non-linear with respect to the shape of the trailing edge, wherein the method comprises the steps of:
a) receiving the tire component on the apply member;
b) detecting a plurality of leading endpoints at the leading edge, wherein said leading endpoints are distributed over the length of the leading edge at equal intervals;
c) for each leading endpoint, determining a trailing endpoint at the trailing edge that together with the respective leading endpoint forms a pair of endpoints, such that the interval between each set of two directly subsequent trailing endpoints on the trailing edge is equal to the interval between the set of the two respective, directly subsequent leading endpoints on the leading edge;
d) determining a relative positioning between the leading endpoint and the trailing endpoint for each pair of endpoints;
e) driving the apply member at an apply speed to transfer the tire component in a transfer direction onto the receiving member while driving the receiving member at a receiving speed; and
f) splicing the trailing edge to the leading edge on a building drum;
wherein a ratio between the apply speed and the receiving speed is adjusted when transferring at least one pair of endpoints to improve the relative positioning of the leading endpoint and the trailing endpoint of said at least one pair of endpoints for splicing.

* * * * *